US005339101A

United States Patent [19]

Rawson et al.

[11] Patent Number: 5,339,101

[45] Date of Patent: Aug. 16, 1994

[54] ACOUSTIC INK PRINTHEAD

[75] Inventors: Eric G. Rawson, Saratoga; Babur B. Hadimioglu, Mountian View; Butrus T. Khuri-Yakub, Palo Alto, all of Calif.

[73] Assignee: Xerox Corporation, Stamford, Conn.

[21] Appl. No.: 815,730

[22] Filed: Dec. 30, 1991

[51] Int. Cl.[5] .................... G01D 15/16

[52] U.S. Cl. .................... 347/46

[58] Field of Search .................... 346/140 R

[56] References Cited

U.S. PATENT DOCUMENTS

| | | | |
|---|---|---|---|
| 3,904,996 | 9/1975 | Rosenfeld | 333/196 |
| 4,447,754 | 5/1984 | Wagers | 310/313 R |
| 4,598,261 | 7/1986 | Ballato | 333/195 |
| 4,719,476 | 1/1988 | Elrod et al. | 346/140 R |
| 4,719,480 | 1/1988 | Elrod et al. | 346/140 R |
| 4,748,461 | 5/1988 | Elrod | 346/140 R |
| 4,751,529 | 6/1988 | Elrod et al. | 346/140 R |
| 4,751,530 | 6/1988 | Elrod et al. | 346/140 R |
| 4,751,534 | 6/1988 | Elrod et al. | 346/140 R |
| 4,782,350 | 11/1988 | Smith et al. | 346/140 R |
| 4,797,693 | 1/1989 | Quate | 346/140 R |
| 4,801,953 | 1/1989 | Quate | 346/140 R |
| 5,041,849 | 8/1991 | Quate et al. | 346/140 R |

*Primary Examiner*—A. T. Grimley
*Assistant Examiner*—Sandra L. Brasé
*Attorney, Agent, or Firm*—Rosen, Dainow & Jacobs

[57] ABSTRACT

A printhead for an acoustic ink printer has a piezoelectric transducer on one surface of a substrate. A layer of a dielectric material is provided on the surface of the transducer away from the substrate. A Fresnel lens is formed in the surface of the dielectric layer away from the transducer, for focusing sound energy near the surface of a body of ink adjacent the dielectric layer. Thus the transducer and lens are both on the same side of the substrate. A pit may be formed in the substrate under the transducer. The transducer may be a body of piezoelectric material sandwiched between a pair of electrodes, the lower electrode of which has a thickness that is a quarter wave at the excitation frequency of the transducer. An anti-reflective coating may be provided on the lower surface of the substrate, with a body of an absorptive material abutting the anti-reflective layer, or an absorptive material having an acoustic impedance approximately matching that of the substrate may be coated on the lower surface of the substrate.

26 Claims, 3 Drawing Sheets

ACOUSTIC INK PRINTHEAD

This invention relates to acoustic ink printers, and is more in particular directed to an improved printhead for an acoustic ink printer.

BACKGROUND OF THE INVENTION

U.S. Pat. Nos. 4,751,530, Elrod et al, 4,751,534, Elrod et al, and 4,751,529, Elrod et al, assigned to the assignee of the present application, disclose printheads for acoustic ink printers, wherein an acoustic transducer is deposited or otherwise coupled to the lower surface of a substrate, and a concave lens is formed in the opposite surface of the substrate. The lens, which may have a quarter wave impedance matching layer to avoid the reflection of waves back to the transducer, focuses the acoustic beam at a point near the surface of an ink pool adjacent the upper surface of the substrate. The transducer in these arrangements may comprise a piezoelectric element sandwiched between a pair of electrodes, to excite the piezoelectric element into a thickness mode oscillation. Modulation of RF excitation applied to the piezoelectric element causes the radiation pressure, which the focused acoustic beam exerts against the upper surface of the pool of ink, to swing above and below a predetermined droplet ejection threshold level as a function of demand.

In acoustic ink printers, crosstalk due to near field diffraction of nominally planar sound waves, in a typical substrate, can adversely affect ejection stability and precision. As an example, in a typical structure employing a 1.5 mm thick transducer with a radius of 340 μm, intensity crosstalk due to near field diffraction is computed to be 3.7%. This is a substantial fraction of the acoustic ink printer 10% power regulation, within which it is desired to maintain the power, and can noticeably contribute to crosstalk.

Acoustic ink printheads are also disclosed, for example, in U.S. Pat. No. 4,719,476, Elrod et al, U.S. Pat. No. 4,719,480, Elrod et al, U.S. Pat. No. 4,748,461, Elrod, U.S. Pat. No. 4,782,350, Smith et al, U.S. Pat. No. 4,797,693, Quate, and U.S. Pat. No. 4,801,953, Quate, each of which is also assigned to the present assignee.

SUMMARY OF THE INVENTION

The invention is therefore directed to the provision of an improved printhead for an acoustic ink printer, wherein crosstalk between transducer elements is eliminated or minimized. In addition, the invention is directed to the provision of a printhead for an acoustic ink printer wherein a minimum amount of power is directed into a substrate that supports the transducer elements, and reflection of waves from surfaces of the substrate to the transducer is minimized.

An acoustic ink printer printhead in accordance with the invention may have a substrate of, for example, silicon. A lower electrode layer, for example of Ti-Au, is provided on the top of the substrate, for receiving an RF input. A piezoelectric layer that is either a half-wavelength or a quarter-wavelength thick, for example of ZnO, is deposited on the lower electrode. Either a thin A1 electrode (in the case of a half-wavelength thick piezoelectric layer) or a quarter wavelength plated gold electrode (in the case of a quarter wavelength thick piezoelectric layer) is provided on the top of the piezoelectric layer, and is adapted to be grounded in use to avoid capacitive coupling to the conductive liquid ink. A Fresnel lens of polyimide or parylene is provided on top of the upper electrode. A liquid ink layer is maintained above the Fresnel lens. In this structure, the piezoelectric element is very close to the Fresnel lens, to minimize crosstalk.

In order to minimize downward radiation from the piezoelectric layer:

1. The substrate may be of <111> oriented silicon, with a cylindrical pit etched from the substrate below each transducer, or 2. Alternatively, the bottom electrode may be of a quarter wavelength, and have a characteristic impedance which is substantially mismatched to the substrate's characteristic impedance.

In order to eliminate or minimize reflection of any downwardly radiated acoustic power from the lower surface of the substrate, such reflection may be frustrated by:

1. Providing a quarter wavelength anti-reflective coating on the bottom of the substrate for coupling ultrasound into an absorptive medium below the substrate, or 2. Providing a thick acoustically absorptive material with an impedance effectively matched to the substrate (for example, certain epoxy cements) which is applied directly to the bottom surface of the substrate.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
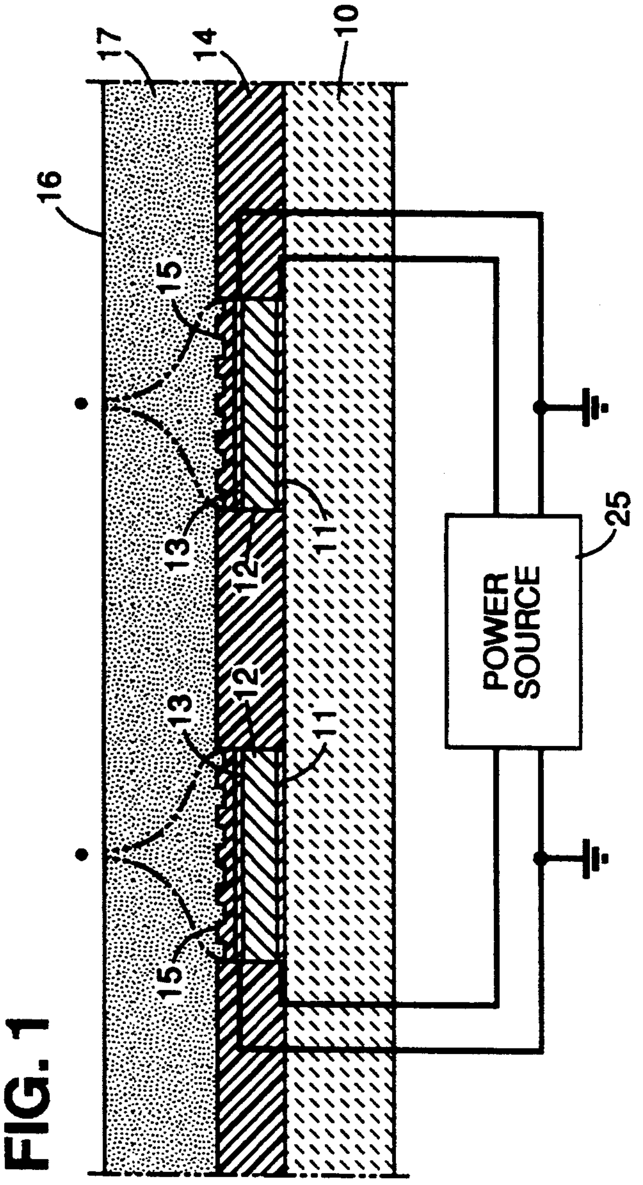
FIG. 1 is a cross-sectional view of a printhead for an acoustic ink printer in accordance with one embodiment of the invention.
Figure 2:
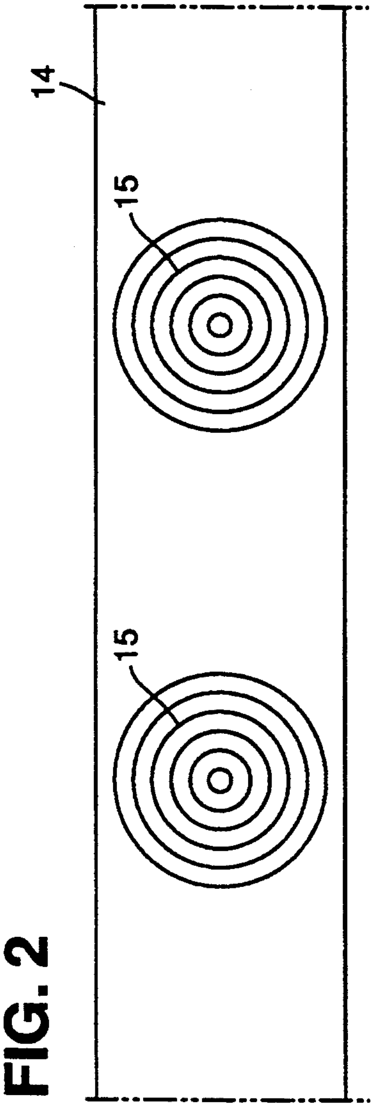
FIG. 2 is a top view of the printhead of FIG. 1, without the layer of ink thereon.

Referring now to the drawings, and more in particular to FIGS. 1 and 2, therein is illustrated an acoustic ink printer printhead comprising a substrate 10, for example a glass substrate. One or more thin Ti-Au layers 11 are provided on the top of the substrate 10, to serve as lower electrodes for the transducers. Separate layers 12 of piezoelectric material such as ZnO are grown on the layers 11, and separate upper electrodes 13, for example of a thin layer (e.g. 1 μm) of aluminum or a quarter wave thickness gold, are provided on the upper surfaces of the piezoelectric transducers. The upper electrodes have diameters, for example, of 340 μm. The upper and lower electrodes are connected to a source 25 of conventionally modulated RF power.

A dielectric layer 14 is deposited on top of the above described structure, the dielectric layer being, for example, of polyimide or parylene. This dielectric layer is thin compared to the diameters of the upper gold electrodes, and may be, for example, 20 to 50 μm thick. Fresnel lenses 15 are etched in the top of the dielectric layer above each of the piezoelectric transducers. As a consequence, the lenses lie in a plane that is very close to the planes of the transducers.

The above described structure may be fabricated in accordance with conventional techniques.

The close proximity of the Fresnel lenses to the planes of the transducers essentially eliminates or substantially mitigates any crosstalk between the transducers that results from diffraction of the sound waves between the transducers and the lenses.

In operation, sound energy from the transducers is directed upwardly toward the Fresnel lenses, and the lenses focus the energy to the region of the upper surface 16 of a body of ink above the transducers, as illustrated in dashed lines in FIG. 1.

In accordance with a preferred embodiment of the invention, the upper electrodes are connected to reference potentials, such as ground reference, and the driving signal voltages are applied to the lower electrodes 11. This arrangement assures that capacitive coupling to the ink (which is conductive and also held at ground potential), does not create a detrimental leakage path for RF power.

In this application we will frequently refer to the characteristic impedance Z of a material in an abbreviated form. For example, the characteristic impedance of water is approximately $Z=1.5\times10^6$ kg/m.s. Henceforth in this application, we well drop both the $10^6$ multiplier and mention of the units. For example the notation $Z=1.5$ will be understood to mean $Z=1.5\times10^6$ kg/m.s.

When using the acoustic ink printhead in accordance with the invention, once a significant acoustic power has been launched into the dielectric layer, a relatively high proportion of that power is coupled from the dielectric into the ink, which may be a liquid. The coupling coefficient from the dielectric (assuming parylene with a $Z=4$ is used) into water (having a Z of 1.5) is about 80%, for a coupling loss of about 1.0 dB. This result constitutes a significant improvement when compared with conventional printheads. For example, in one conventional arrangement, wherein power was coupled from 7740 Pyrex (having a Z of 12.5) into water, the coupling loss was 2.1 dB. In another example of a conventional structure, power was coupled from silicon (having a Z of 20) into water, with a loss of 5.8 dB. Accordingly, the printhead of the invention assures that a significant proportion of the power is coupled from the dielectric layer into the ink.

Figure 3:
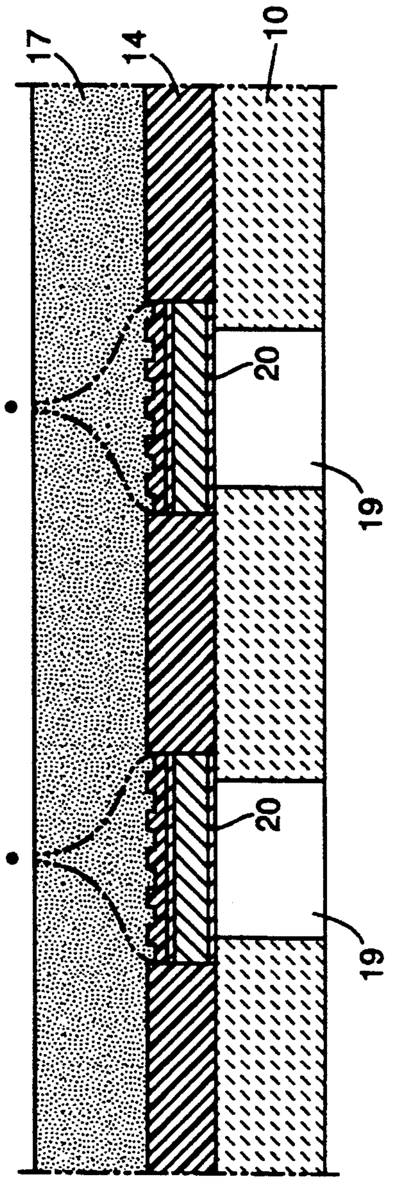
FIG. 3 is a cross-sectional view of a modification of the printhead of the invention.
Figure 4:
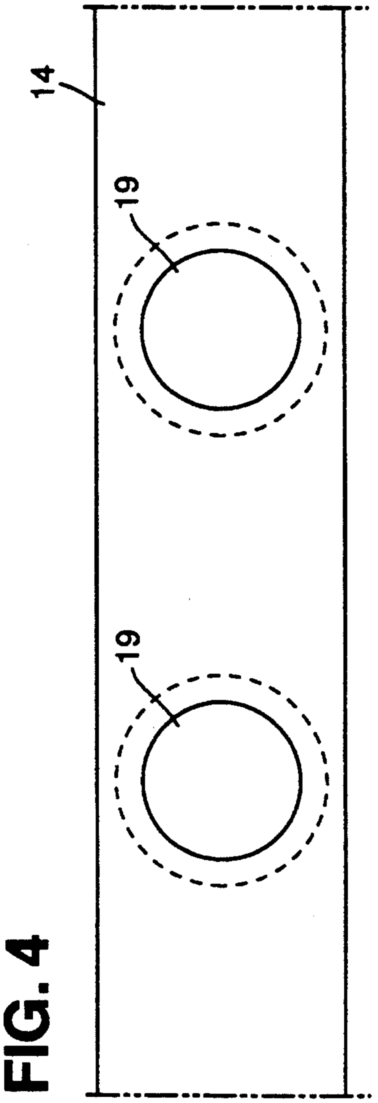
FIG. 4 is a bottom view of the printhead of FIG. 3.

In order to insure that a substantial fraction of the acoustic power is radiated upwardly into the dielectric, and thence into the ink, in accordance with a further feature of the invention as illustrated in FIGS. 3 and 4, the substrate 10 may be a <111> oriented single crystal Si, the crystal being etched away under each of the transducers to form a cylindrical pit 19 extending to the respective lower electrode 11. This results in the provision of an air interface 20 at the lower side of each of the transducers that has such a low impedance ($Z=0.000043$) that essentially no acoustic energy is transmitted in the downward direction, resulting in the radiation of substantially all of the power in the upward direction into the ink, as desired.

Alternatively to the provision of the cylindrical pits in a <111> silicon substrate, the bottom electrodes 11 may for example be of gold, having a quarter wave thickness and an impedance ($Z=62.6$) that is substantially mismatched with respect to the substrate ($Z=6$ to 12, if glass). When the impedance of the quarter wave thickness electrodes substantially mismatches the impedance of the substrate, very little acoustic power is radiated downwardly into the substrate. This arrangement eliminates the necessity of etching pits under each of the transducers, and has been found to be satisfactory for use with a number of substrate materials such as, for example, Si<111> or Si<100> both with $Z\simeq20$, 7740 Pyrex, fused quartz and common glass, all with Z between 6 and 14.

Figure 5:
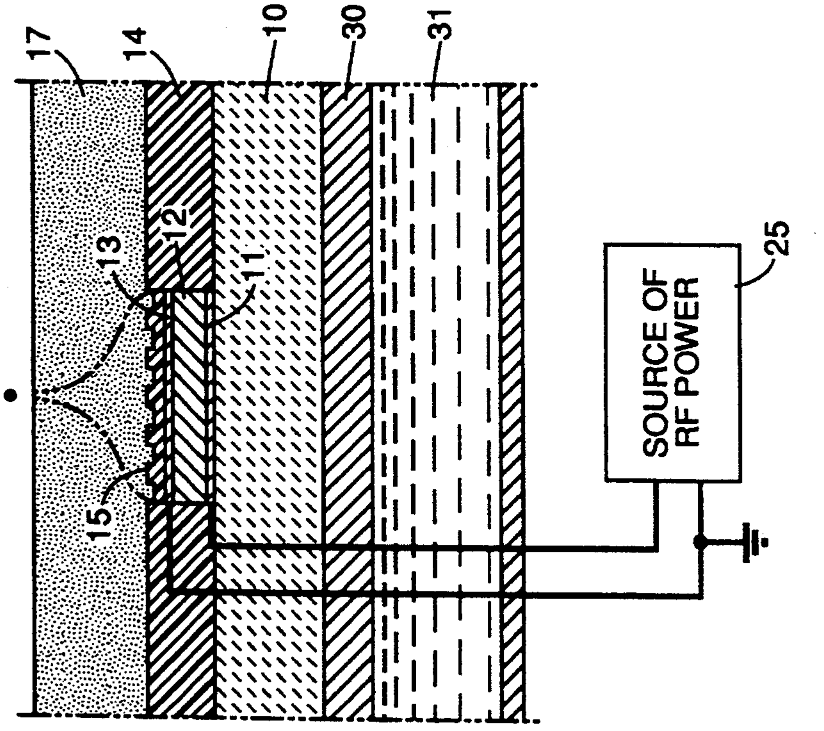
FIG. 5 is cross-sectional view of a printhead in accordance with a further modification of the invention.

It is desirable to prevent the power from the transducers from being reflected from the bottom surface of the substrate, since such reflected power could return to the transducer and interfere with the oscillation thereof. In order to frustrate such reflection, a quarter wave anti-reflection coating 30 may be provided on the bottom surface of the substrate, as illustrated in FIG. 5, thereby coupling the sound efficiently into a material 31 below the substrate which is acoustically absorptive. Thus, a quarter wave coating of paralene under the substrate 10 forms an effective anti-reflection coating into the layer 31, which may be a viscous fluid, such as mineral oil, to effectively absorb the ultrasound.

Figure 6:
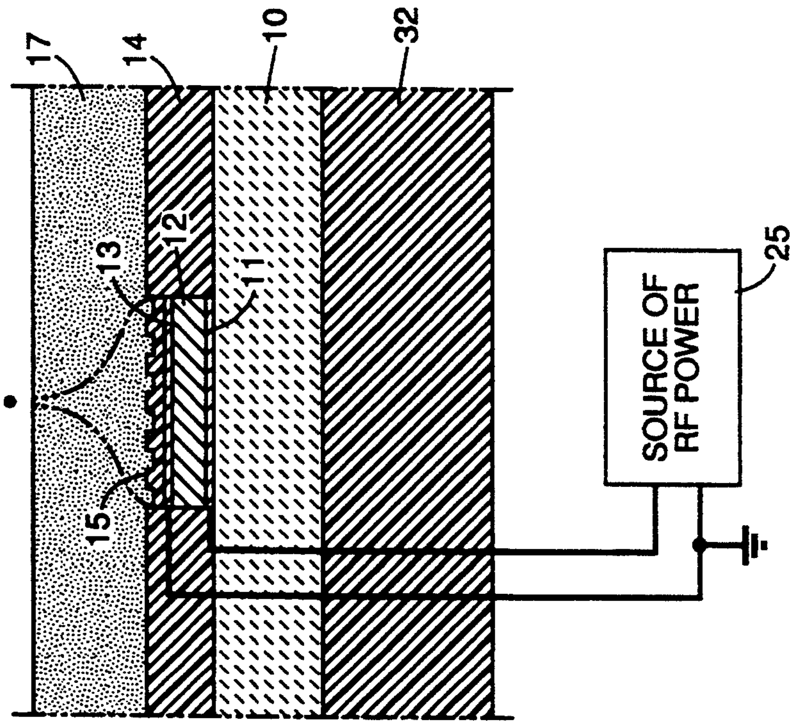
FIG. 6 is a cross-sectional view of a printhead in accordance with a still further modification of the invention.

A further modification of the invention is illustrated in FIG. 6, which differs from the embodiment of the invention illustrated in FIG. 5 in that the coating 30 and material 31 are replaced by a material 32 with a Z which approximately matches the substrate (for example, epoxy). This eliminates the need for the anti-reflection layer 30 and eliminates the complexity of using a liquid material 31, such as mineral oil, for the rear surface sound absorber.

While the examples of materials and dimensions for the various elements, as discussed above, constitute preferred materials and dimensions, the invention is not limited to such examples, and other conventional materials and thicknesses may be employed. In addition, while the lens and transducers are preferably round, the invention is not limited to this shape.

While the invention has been disclosed and described with reference to a limited number of embodiments, it will be apparent that variations and modification may be made therein, and it is therefore intended in the following claims to cover each such variation and modification as falls within the true spirit and scope of the invention.

What is claimed is:

1. A printhead for an acoustic ink printer, comprising a substrate, an acoustic transducer on a first surface of said substrate, a dielectric layer on said transducer, and a lens formed in said dielectric layer over the transducer.

2. The printhead of claim 1 wherein said acoustic transducer comprises a body of a piezoelectric material.

3. The printhead of claim 2 wherein said acoustic transducer further comprises first and second electrodes on opposite sides of said body of piezoelectric material, whereby said layer of dielectric material is in contact with said second electrode.

4. The printhead of claim 3 further comprising means for connecting said second electrode to a ground reference potential, and means for applying an RF exciting signal to said first electrode.

5. The printhead of claim 3 wherein said first electrode is comprised of a thin layer.

6. The printhead of claim 5 wherein said thin layer is a thin layer of aluminum.

7. The printhead of claim 5 comprising means for exciting said transducer at a given frequency, and wherein said first electrode has a thickness of quarter of a wavelength at said frequency.

8. The printhead of claim 7 wherein said first electrode is gold.

9. The printhead of claim 1 comprising means for exciting said transducer at a given frequency, wherein a layer of a sound absorbing material with a Z which approximately matches that of the substrate is provided on a second surface of said substrate opposite said first surface and extending below said lens.

10. The printhead of claim 1 wherein said lens comprises a Fresnel lens formed in said dielectric layer.

11. In a printhead arrangement for an acoustic ink printer, wherein a plurality of transducers are provided each for generating an acoustic wave, and a lens is mounted to focus each of said waves near a surface of a body of ink, the improvement comprising a substrate having first and second surfaces, each of said transducers having a first surface supported on said first surface of said substrate and a second surface opposite said first surface of each of said transducers, and a layer of a dielectric material covering said second surface of each of said transducers, said lens comprising a lens formed in the surface of said dielectric layer opposite said second surface of each of said transducers, said lens being located close to the second surface of each of said transducers and between the latter and the body of ink.

12. The printhead arrangement of claim 11 wherein said lens comprises a Fresnel lens.

13. The printhead arrangement of claim 11 wherein each transducer comprises a layer of a piezoelectric material sandwiched between first and second electrodes, with said first and second electrodes defining said first and second surfaces, respectively, of said transducer, and further comprising an excitation source connected between said first and second electrodes, said second electrodes being connected to a reference potential.

14. The printhead arrangement of claim 13 wherein said layer of piezoelectric material is a layer of ZnO having a thickness of one half a wavelength at the frequency of the output of said source, and said first electrode is a thin aluminum layer on said substrate.

15. The printhead arrangement of claim 13 wherein said layer of piezoelectric material is a layer of ZnO having a thickness of one quarter of a wave-length at the frequency of the output of said source, and said first electrode is a quarter wavelength thick layer on said substrate.

16. The printhead arrangement of claim 11 wherein said substrate has pits extending through between said first and surfaces thereof, each said pit being aligned with said transducer.

17. The printhead arrangement of claim 11 wherein each said transducer comprises a layer of a piezoelectric material sandwiched between first and second electrodes, with said first electrode defining said first surface of said transducer, and further comprising an excitation source connected between said first and second electrodes for exciting said transducer at a given frequency, said first electrode having a thickness of a quarter wave at said frequency.

18. The printhead arrangement of claim 11 wherein each said transducer comprises a layer of a piezoelectric material sandwiched between first and second electrodes, with said first electrode defining said first surface of said transducer, and further comprising an excitation source connected between said first and second electrodes for exciting said transducer at a given frequency, and a layer of an anti-reflection material of a thickness of a quarter wave at said frequency on said second surface of said substrate, and further comprising a body of a sound absorptive material abutting said layer of anti-reflection material.

19. The printhead arrangement of claim 11 wherein each said transducer comprises a layer of a piezoelectric material sandwiched between first and second electrodes, with said first electrode defining said first surface of said transducer, and further comprising an excitation source connected between said first and second electrodes for exciting said transducer at a given frequency, and a layer of a sound absorbing material on said second surface of said substrate, said sound absorbing material having a Z which approximately matches that of said substrate.

20. The printhead arrangement of claim 11 wherein each said transducer comprises a layer of a piezoelectric material sandwiched between first and second electrodes, with said first electrode defining said first surface of said transducer, and wherein said second electrode is round and the thickness of said dielectric layer abutting said second electrode is less than the diameter of said second electrode.

21. In a printhead arrangement for an acoustic ink printer, wherein a plurality of transducers are provided each for generating an acoustic wave, and a lens is mounted to focus each of said waves near a surface of a body of ink, the improvement comprising a substrate having first and second surfaces, each said transducer being located adjacent said first surface of said substrate, a layer of a dielectric material covering each of said transducers, each said lens being formed in the surface of said dielectric layer remote from said transducer whereby the transducers and the lenses are both adjacent said first surface of the substrate and on the same side of the substrate.

22. The printhead arrangement of claim 21, wherein each said lens comprises a Fresnel lens formed in said dielectric layer.

23. The printhead arrangement of claim 21, further comprising means for preventing the acoustic waves from passing completely through the substrate.

24. The printhead arrangement of claim 21, wherein the transducers are closely spaced to one another, and each of the lens are closely spaced to the adjacent transducer whereby crosstalk between adjacent transducers in minimized.

25. A printhead for an acoustic ink printer, comprising a substrate, an acoustic transducer on a first surface of said substrate, a dielectric layer on said transducer, a lens formed in said dielectric layer over the transducer, a pit extending through said substrate from said first surface to a second surface opposite said first surface and extending below said lens, said pit being aligned with said transducer.

26. A printhead for an acoustic ink printer, comprising a substrate, an acoustic transducer on a first surface of said substrate, a dielectric layer on said transducer, a lens formed in said dielectric layer over the transducer, means for exciting said transducer at a given frequency, said substrate having a second surface opposite said first surface and extending below said lens, an anti-reflective coating of quarter wavelength thickness at said given frequency on the second surface of said substrate, and a sound absorptive material abutting said anti-reflective coating.

* * * * *